US 6,611,377 B1

(12) United States Patent
Chung

(10) Patent No.: US 6,611,377 B1
(45) Date of Patent: Aug. 26, 2003

(54) MICROMECHANICAL DIFFRACTION PHASE GRATING

(75) Inventor: David B. Chung, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 09/613,119

(22) Filed: Jul. 10, 2000

(51) Int. Cl.[7] .................. G02B 5/18; G02B 26/06; G02B 26/08
(52) U.S. Cl. .............. 359/572; 359/569; 359/573; 359/223; 359/224; 359/290; 359/291; 359/900; 345/85; 345/108
(58) Field of Search ............... 359/566, 569, 359/573, 223, 224, 290, 291, 292, 295, 298, 315, 320, 851, 572, 900; 345/84, 85, 108

(56) References Cited

U.S. PATENT DOCUMENTS

| 3,828,548 | A | * | 8/1974 | Martin ................. 345/84 |
| 5,459,610 | A | * | 10/1995 | Bloom et al. ............. 359/572 |
| 5,757,536 | A | * | 5/1998 | Ricco et al. ............. 359/224 |
| 5,841,579 | A | * | 11/1998 | Bloom et al. ............. 359/472 |
| 5,999,306 | A | * | 12/1999 | Atobe et al. ............. 359/295 |
| 6,044,705 | A | | 4/2000 | Neukermans et al. |
| 6,066,860 | A | * | 5/2000 | Katayama et al. ........... 257/71 |
| 6,172,797 | B1 | * | 1/2001 | Huibers ................. 359/291 |

FOREIGN PATENT DOCUMENTS

| WO | WO 96/08031 | 3/1996 |
| WO | WO 99/67671 | 12/1999 |
| WO | WO 00/17695 | 3/2000 |

OTHER PUBLICATIONS

"GLV Technology", Silicon Light Machines, 1999.

* cited by examiner

Primary Examiner—John Juba
(74) Attorney, Agent, or Firm—Trop, Pruner & Hu, P.C.

(57) ABSTRACT

A micromechanical reflection phase grating may be formed of spring-like ribbon reflectors that are secured to a transparent cover positioned over a substrate such as a silicon substrate. The ribbon reflectors are formed independently of the silicon substrate. If a defect occurs in the phase grating and particularly the ribbon reflectors, the top plate assembly can be reworked or discarded without sacrificing the relatively expensive silicon substrate.

20 Claims, 2 Drawing Sheets

MICROMECHANICAL DIFFRACTION PHASE GRATING

BACKGROUND

This invention relates generally to micromechanical diffractive phase gratings that are also known as grating light valves for display applications.

A micromechanical phase grating includes a plurality of ribbon-shaped reflectors that may be selectively deflected to diffract incident light. In one embodiment, the phase grating includes parallel rows of ribbon reflectors. If alternate rows of reflectors are flexed downwardly relative to the other reflectors, incident light may be diffracted.

When the reflectors are all in the same plane, incident light is reflected back on itself. By blocking that light that returns along the same path as the incident light, a dark spot may be produced in a viewing system.

Conversely, when alternate reflectors are deflected, the diffracted light may be at an angle to the incident light which may bypass the blocking element that blocks light returning along the incident light path. This diffracted light then produces a bright spot in the viewing system.

Thus, a phase grating may be created which selectively produces light or black spots. In addition, gray scales and color variations may be produced in some embodiments.

One problem with conventional designs for micromechanical reflection phase gratings is that they are formed on the silicon substrate. That substrate may include other high value components fabricated beneath the phase grating. Thus, if the phase grating is not formed properly, the entire silicon-based device may be ruined. This greatly increases yield problems and therefore fabrication costs.

Therefore, it would be desirable to have a way to form micromechanical reflection phase gratings in a way which does not risk the finished silicon wafer when defects occur in the formation of the micromechanical phase grating.

DETAILED DESCRIPTION

Figure 1:
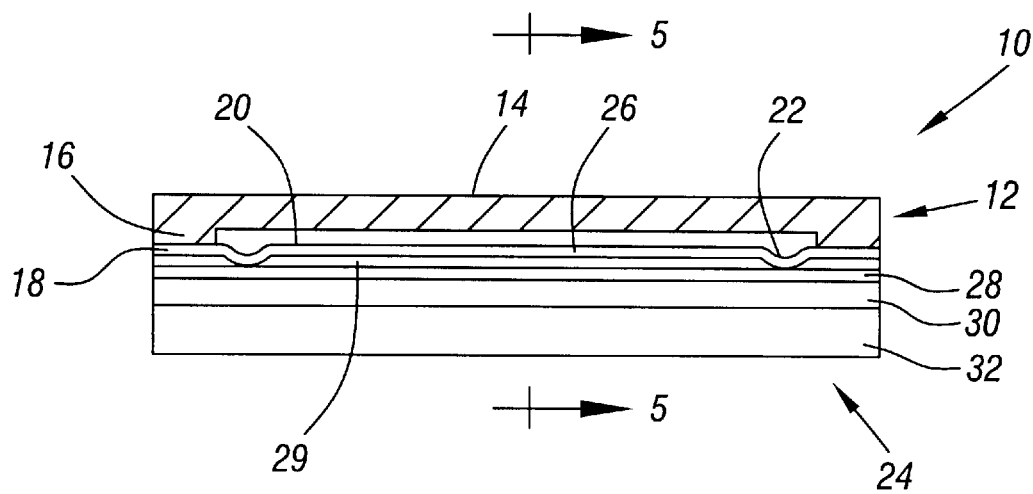
FIG. 1 is a greatly enlarged cross-sectional view of one embodiment of the present invention.

Referring to FIG. 1, a micromechanical reflection phase grating or light valve 10 includes a top plate assembly 12 that may be clamped or otherwise secured to a bottom plate assembly 24. The top plate assembly 12 may include a transparent cover 14 having a stepped portion 16 in one embodiment of the present invention. Secured to the transparent cover 14 are rows of resilient ribbon reflectors 18. The top surfaces of the ribbon reflectors 18 may have a coating 20 that makes them reflective. The ribbon reflectors 18 rest on supports 22 on the bottom plate assembly 24.

Thus, the central portions 26 of the ribbon reflectors 18 may be deflected as leaf springs. That is, once deflected towards the bottom plate assembly 24, the reflectors 18 ultimately return to the undeflected position, shown in FIG. 1.

The top plate assembly 12 may be secured to the bottom plate assembly 24 using a clamping housing (not shown). The bottom plate assembly 24 includes a conductive bottom electrode 28 that in one embodiment of the present invention may be formed of tungsten. Beneath the electrode 28 is an insulator layer 30 that in one embodiment of the present invention may be formed of silicon oxide. Beneath the insulator 30 is a silicon substrate 32, in one embodiment. The silicon substrate 32 may be formed from a wafer having electronic components integrated therein. For example, the substrate 32 may form the driving circuitry for the phase grating 10 and may also include other electronic components including a processor and memory as examples.

In another embodiment, the top plate assembly 12 may be hermetically sealed, using adhesive for example, to the bottom plate assembly 24. An inert gas may be maintained in the region between the assemblies 12 and 24. As another alternative, the cover 14 may be formed of two separate pieces, one forming the stepped portion 16 and the other forming the remainder of the cover 14. The pieces may then be adhesively secured together, in one embodiment.

Because of the configuration of the phase grating 10, the top plate assembly 12 may be formed independently of the bottom plate assembly 24. In such case, if a defect or failure occurs in connection with the top plate assembly 12, only the top plate assembly 12 may be discarded or reworked. In this way, the value incorporated into the completed bottom plate assembly 24, that may include a large number of components not directly associated with the phase grating 10 function, may be preserved.

Figure 2:
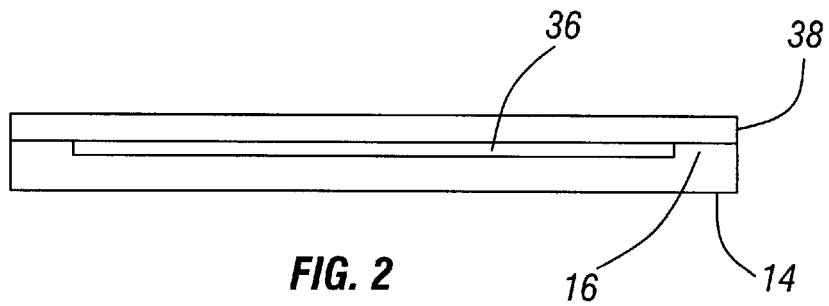
FIG. 2 is a greatly enlarged cross-sectional view showing an initial stage of manufacture of the embodiment shown in FIG. 1.
Figure 3:
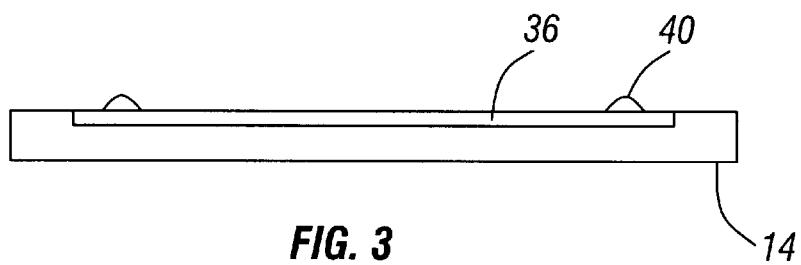
FIG. 3 is a greatly enlarged cross-sectional view of a subsequent stage of manufacture of the embodiment shown in FIG. 2.
Figure 4:
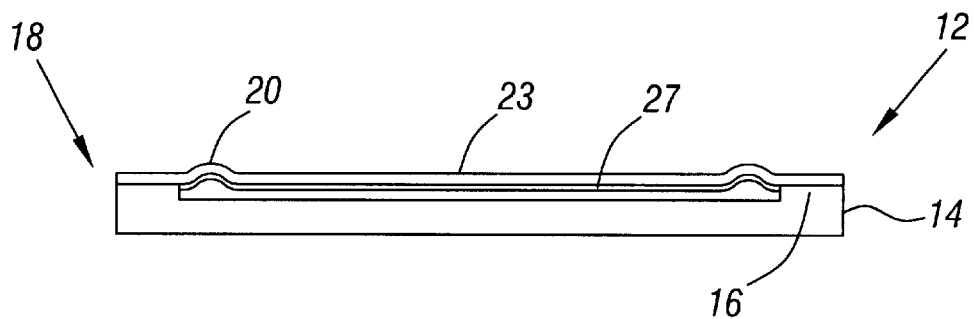
FIG. 4 is a greatly enlarged cross-sectional view of a completed top plate assembly.

Since the bottom plate assembly 24 may be formed using conventional techniques, the ensuing discussion focuses on the formation of the top plate assembly 12 as illustrated in FIGS. 2–4. In FIG. 2, the transparent cover 14 has been defined and is inverted with respect to the orientation shown in FIG. 1. The step 16 creates a channel that may be filled with a layer 36. In one embodiment of the present invention, the layer 36 may be a first type of photoresist. Covering the layer 36 and the step 16 is a second layer 38. The layer 38 may be photoresist as well. For example, in one embodiment of the present invention, the layers 36 and 38 may be positive or negative photoresist. In other embodiments, one of the layers 36 or 38 may be positive photoresist and the other layer may be negative photoresist.

Using photolithographic techniques for example, as illustrated in FIG. 3, a bump or hillock 40 may be defined over the layer 36 by selective removal of the layer 38 in one embodiment of the present invention. For example, the hillocks 40 may be developed so that they remain after the rest of the layer 38 is photolithographically removed. Alternatively, the hillocks 40 may be undeveloped so that they remain when the other regions are removed in a photolithographic technique where developed regions are removed.

Next, as shown in FIG. 4, a layer 23 of a flexible or resilient material may be formed over the FIG. 3 structure, to create the reflectors 18. In one embodiment of the present invention, the layer 23 may be formed of deposited nitride. Before depositing the layer 23, a reflective coating material 27, such as an aluminum alloy, may be coated over the layer 36. After the layer 23 is formed, the reflective coating material 27 preferentially adheres to the layer 23. The individual reflectors 18 may be defined from the layer 23 in a conventional fashion.

Thereafter, the layer 36 may be photolithographically removed. The reflectors 18 are formed in a cantilevered arrangement over the gap 29 (FIG. 1) formed by the supports 22 in the reflectors 18. The assembly 12 is then completed and may be inverted and secured over a bottom plate assembly 24 to form the structure shown in FIG. 1.

Figure 5:
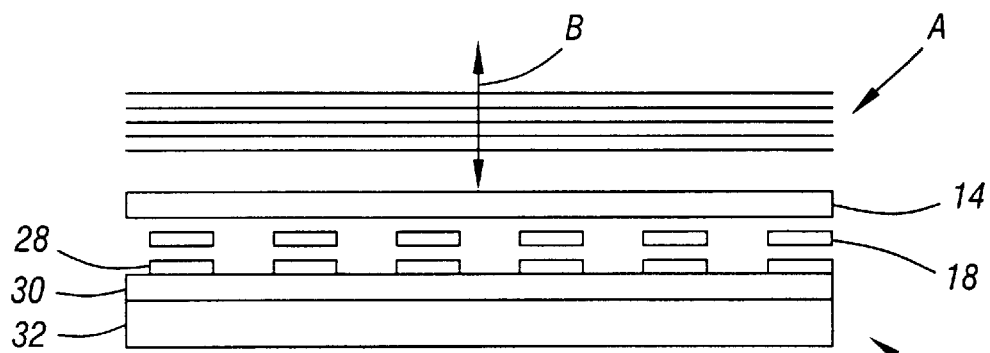
FIG. 5 illustrates the operation of the embodiment shown in FIG. 1 when all of the ribbon reflectors are undeflected.
Figure 6:
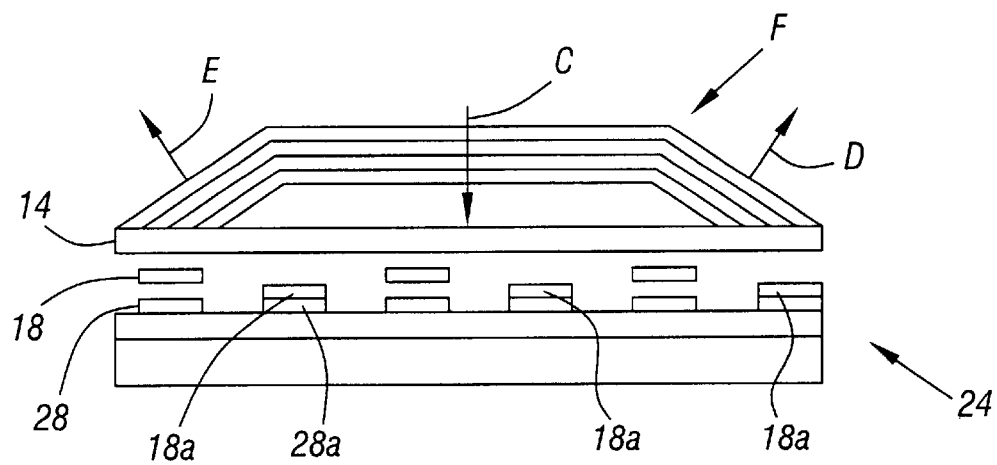
FIG. 6 illustrates the operation of the embodiment shown in FIG. 1 when alternate ribbon reflectors are deflected.

Referring to FIGS. 5 and 6, the phase grating 10 operates in a conventional fashion. When the ribbon reflectors 18, which are part of the top plate assembly 12, are undeflected, incident light "B" is reflected back in the direction B. If the returning light is blocked, the result is a dark pixel. Thus, the arrows B and the light patterns "A" illustrate the formation of a dark pixel.

Conversely, alternate ribbon reflectors 18a may be deflected towards the bottom plate assembly 24, as shown in FIG. 6. For example, an appropriate electrical charge through the conductive bottom electrodes 28a may attract the reflectors 18a toward the bottom plate assembly 24. Then, incident light, indicated as C, may be diffracted by the resulting phase grating between the ribbon reflectors 18 and 18a. The electrode 28 may be formed of alternating elements 28a that are charged differently than the remaining electrodes 28.

As a result, two diffracted fronts D and E are created that are angled with respect to the path of the incident illumination C. The fronts D and E, diffracted by the phase grating effect, are not blocked by the blocking element (not shown) that blocks the reflected light B in the embodiment shown in FIG. 5.

Figure 7:
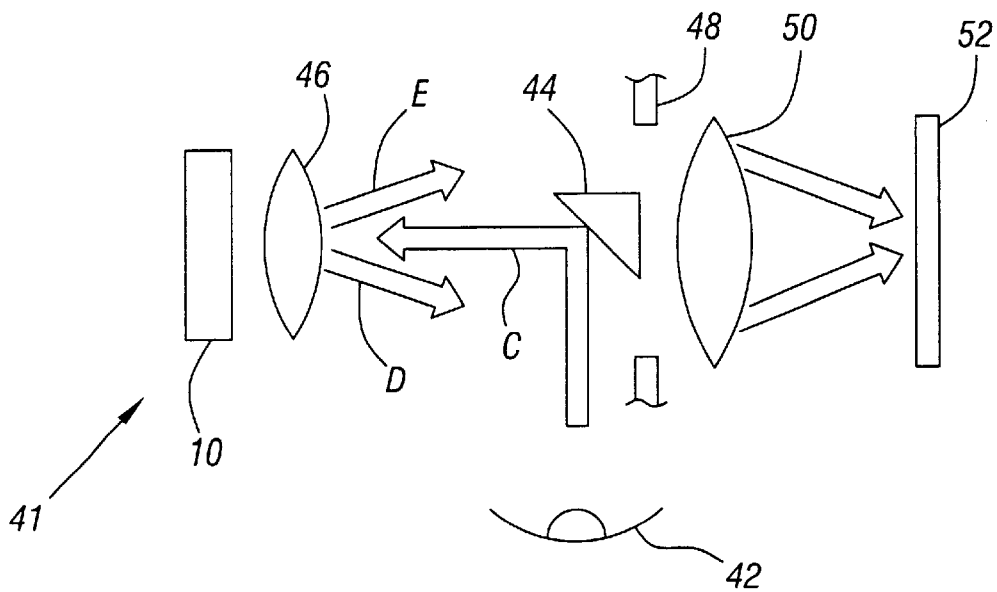
FIG. 7 shows a display system in accordance with one embodiment of the present invention.

For example, referring to FIG. 7, a projection system 41 may use the phase grating 10. A white light source 42 creates light "C" that is reflected by the prism 44 towards the lens 46. The lens 46 may be a focus lens that causes the incident light to be focused on the phase grating 10. The light, indicated by the arrows E and D in FIGS. 6 and 7, diffracted by the grating 10 then bypasses the prism 44. The light patterns E and D, after passing through an opening 48, are then focused by a capture lens 50 onto a projection screen 52. As a result, an array of light and dark pixel areas may be selectively defined to create an image for display.

While a simple blocked light system is illustrated, the same techniques may be utilized in multicolor systems and gray scale systems. Light that is reflected by undeflected ribbon reflectors 18 when the reflectors 18 are not deflected, may be reflected by the prism 44 out of the system 10.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A phase grating comprising:
   a bottom plate assembly including a semiconductor substrate; and
   a top plate assembly sealed over said bottom plate assembly, said top plate assembly including a transparent cover and at least one ribbon reflector mounted on said cover for spring deflection towards and away from said bottom plate assembly, said ribbon reflector being attached to said top plate assembly at two spaced points, said ribbon reflector including at least one protrusion that always rests on said bottom plate assembly.

2. The grating of claim 1 wherein said grating includes a plurality of ribbon reflectors.

3. The grating of claim 1 wherein said substrate is a silicon die.

4. The grating of claim 1 wherein said top plate assembly includes a stepped portion that contacts said ribbon reflector.

5. The grating of claim 4 wherein said stepped portion is integral with said top plate assembly.

6. The grating of claim 1 wherein said bottom plate assembly and said top plate assembly are coupled in a removable connection.

7. The grating of claim 6 wherein said removable connection is a clamping connection.

8. The grating of claim 1 wherein said top plate assembly is removable from said bottom plate assembly.

9. The grating of claim 1 wherein said substrate is an integrated circuit.

10. A display comprising:
    a phase grating including a bottom plate assembly including a substrate and a top plate assembly sealed over said bottom plate assembly, said top plate assembly including a transparent cover and at least one ribbon reflector mounted on said cover for spring deflection toward and away from said bottom plate assembly, said ribbon reflector attached to said top plate assembly at two spaced points and including at least one protrusion that always rests on said bottom plate assembly; and
    a light source for illuminating said grating.

11. The display of claim 10 including an optical system.

12. The display of claim 11 wherein said display is a projection display.

13. The display of claim 12 including a prism arranged to reflect light from the light source towards said grating.

14. The display of claim 12 including a display screen.

15. A method of forming a phased grating comprising:
    forming a bottom plate assembly including a semiconductor substrate;
    forming a top plate assembly sealed over said bottom plate assembly, said top plate assembly including a transparent cover and at least one ribbon reflector mounted on said cover at two spaced locations for spring deflection towards and away from said bottom plate assembly between said spaced locations, said ribbon reflector including a protrusion; and
    removably coupling said bottom plate assembly and said top plate assembly with said protrusion maintaining contact with said bottom plate assembly.

16. The method of claim 15 including using said phase grating to develop an image for display.

17. The method of claim 15 including clamping said bottom plate assembly to said top plate assembly.

18. The method of claim 15 including spacing said top plate assembly from said bottom plate assembly using a stepped portion on said top plate assembly.

19. The method of claim 15 including defining an integrated circuit in said substrate.

20. The method of claim 15 including deflecting said ribbon reflector by generating an attractive force in said substrate.

* * * * *